United States Patent [19]
Roberts et al.

[11] 3,734,626
[45] May 22, 1973

[54] LIGHT APPARATUS FOR TESTING SURFACES

[75] Inventors: Donald Lee Roberts, Cypress; David John George, Westlake Village, both of Calif.

[73] Assignee: Control Data Corporation, Minneapolis, Minn.

[22] Filed: Jan. 14, 1972

[21] Appl. No.: 217,755

[52] U.S. Cl. .................. 356/120, 356/124, 356/209, 356/237
[51] Int. Cl. ............................................. G01b 11/30
[58] Field of Search ...................... 356/120, 124, 209, 356/237, 167, 109

[56] References Cited

OTHER PUBLICATIONS

"Smithsonian Contributions To Knowledge" Vol. 34, 1904 pp. 25–30.

*Primary Examiner*—Ronald L. Wibert
*Attorney*—Edward L. Schwarz and Joseph A. Genovese

[57] ABSTRACT

Apparatus for testing surface flatness of an object such as a magnetic disc. A laser light beam is reflected off the surface to be tested, is caught and returned by a corner cube reflector so that the returning rays are directed parallel to the incoming beam and are again reflected off of the same spot area receiving the incoming laser beam. The light returning from the corner cube reflector is then reflected from the surface to be tested onto a beam splitter from which it is reflected to a spot-forming lens which forms a light spot at the focal plane, and which light spot diameter is a measure of the surface irregularity of the area tested on the disc or object. The position of the light spot always remains stably at the same point. If the tested area of the disc were perfectly flat when the light spot at the principal focal plane would be of a minimum diameter. Any enlargement from this minimum diameter is a measure of surface irregularity of the disc or object surface being tested. Means are provided for scanning the size of the light spot which is also made independent of the angular plane or level of the disc tested. Light detection means working in conjunction with an aperture scanning means provide a display showing the amount of deviation from flatness of the surface area tested. The sensitivity of the apparatus is such that it can easily detect surface deviations at least 35 micro-inches per inch per inch from flatness.

10 Claims, 13 Drawing Figures

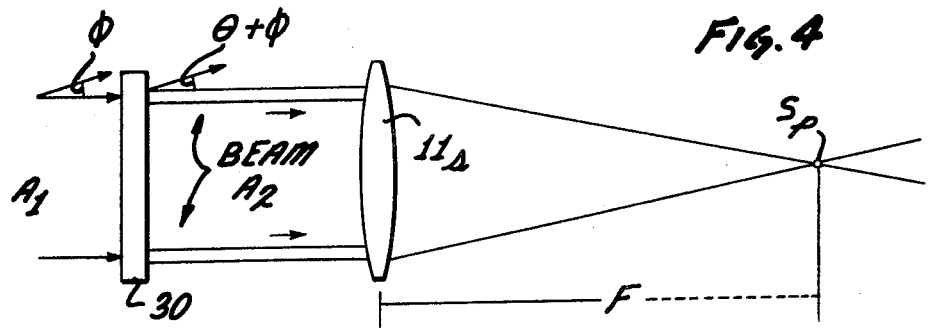
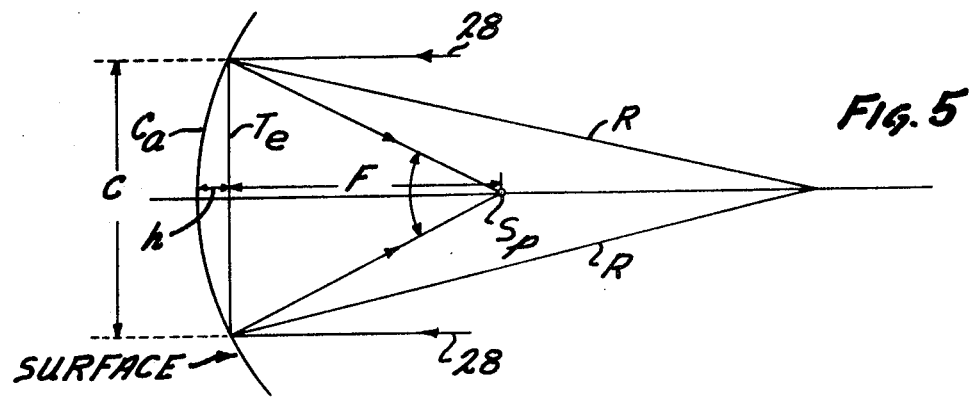
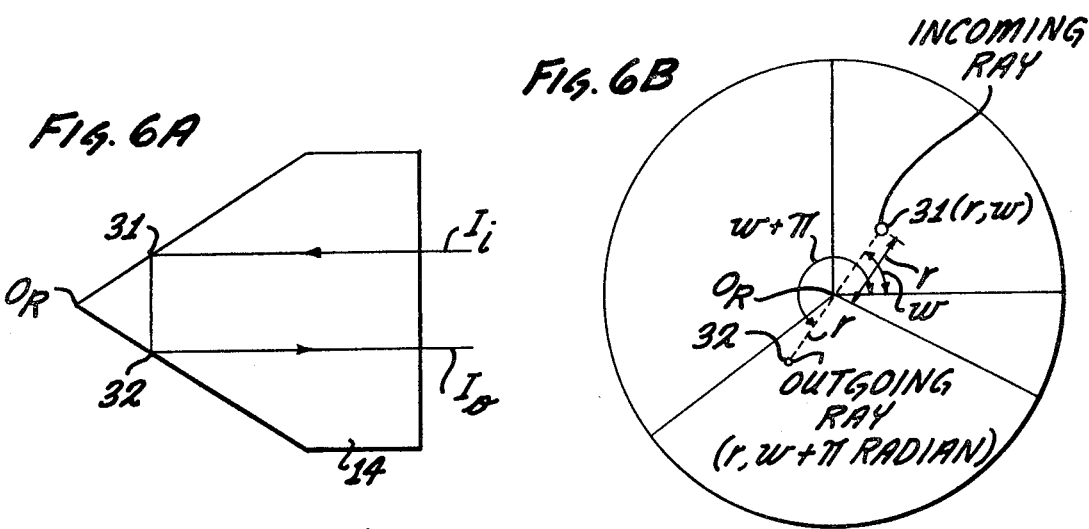
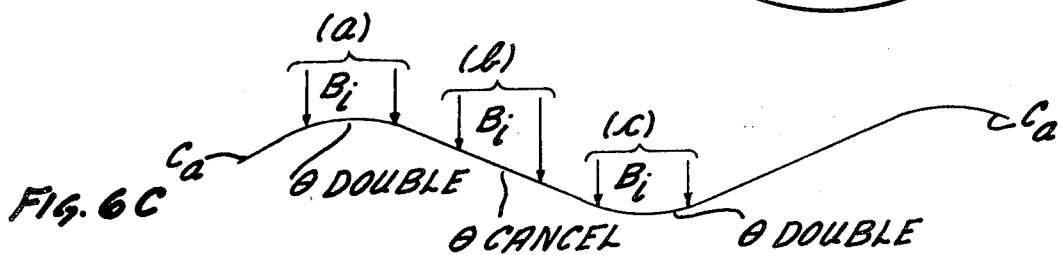

LIGHT APPARATUS FOR TESTING SURFACES

BACKGROUND OF THE INVENTION

This invention involves apparatus using collimated light for inspecting surfaces for imperfections and irregularities that deviate from a desirable surface flatness. It is especially useful for inspecting magnetic discs used in disc storage systems where it is important for high recording density and for accuracy that the surface of the disc be of exceptional flatness.

In a broader sense, the field of the invention might be said to involve optical testing instruments and optical measurement.

SUMMARY OF THE INVENTION

It is a primary object of the present invention to determine deviations from flatness of the surfaces of magnetic discs or other objects requiring high surface regularity.

In this regard, a light beam is used, for example, from a laser light source and is collimated to a fixed size (as, for example, one-inch diameter) light beam which is directed onto a particular surface area of, for example, a magnetic disc. This incoming light is thus reflected according to the surface characteristics of the area of the disc and is directed to a corner cube reflector. The corner cube reflector takes the incoming light rays (reflected from the disc surface) and returns them parallel to the incoming beam so that the outgoing beams from the corner cube reflector follow the path of the incoming beams and are directed back exactly to the same area of test on the magnetic disc surface. The beam reflected from the corner cube reflector and directed to the surface area of test is now reflected again onto a beam splitter. This beam may be called the retro-reflected beam since it is a result of having passed twice over the test area of the magnetic disc. The retro-reflected beam is reflected from the beam splitter through a spot-forming lens, where there is formed a light spot at the focal plane of the spot forming lens. This light spot at the focal plane of the spot forming lens will have a minimum diameter spot if the disc area tested is of a perfectly flat nature.

The more deviation from flatness in the area being tested, the more deviation from parallelism occurs in the retro-reflected beam from the test area. As a result, the size of the light spot formed at the focal plane of the spot forming lens will be found to be of a larger size or diameter. The ratio of the larger size spot to the minimum size spot is a measure of surface irregularity of the surface area of the magnetic disc tested.

At the focal plane of the spot-forming lens where the light spot appears, there is placed a rotating aperture which scans the light spot. This rotating aperture permits passage of light to a light detector which can act as a measure of the size of the light spot at the focal plane. Thus, the light spot size can be compared to the minimum size light spot to form a ratio of deviation which is a measure of surface irregularity as it deviates from perfectly flat surface regularity.

The system is such that the light spot at the focal plane does not deviate in position, but always maintains a constant and fixed position due to the use of the corner cube reflector in conjunction with the beam splitter and the spot-forming lens.

Further, the position level of the magnetic disc or area to be tested is of a non-critical nature and it is not necessary that it be accurately adjusted to a fixed plane since the combination of the corner cube reflector and beam splitter insures that the resultant light spot at the focal plane will always remain constant even though deviation of the disc surface from the fixed position occurs.

Basically, an ideally flat surface will reflect the maximum amount of light in a parallel fashion which will cause the final resultant light spot to assume a minimum spot size since there is no reflection of light from a theoretically flat surface other that the condition in which the angle of incidence equals the angle of reflection.

On the other hand, where a surface is irregular and deviates from the ideally flat condition, then a bundle of incident light on such a surface will be reflected and scattered such that a larger cross section of the laser beam will be developed as a result of the original reflection and the later retro-reflection, thus increasing the size of the final light spot at the focal plane.

Thus, an object of the present invention is to provide a very precise measure of surface flatness which, for example, will detect deviations of 35 micro-inches per inch per inch of surface, a commonly used standard of maximum allowable surface flatness.

Another object of the invention is to provide an optical system whereby flatness measurement of the magnetic disc surface to be tested does not require that the surface be in a fixed position with any degree of accuracy.

Another object of the invention is to provide a novel means for determining the size of a spot of light in space and for comparing it with a standard minimum size spot at the same point in space.

Another object is to provide an optical surface testing apparatus which positions a spot of light at the same point in space regardless of what particular surface area of the tested disc is being scanned.

It is a further object of the invention to provide means for precisely testing the surface characteristics of a magnetic disc very accurately and in a short space of time so that the rate of testing may be speeded up by a factor of hundreds and with greater accuracy.

PRIOR ART

In the prior art, various means of checking the flatness of magnetic discs have been used, both with optical and mechanical methods. Many of the problems reflected in these methods involve the inordinate amount of time necessary, the relatively high expense of the equipment involved and technical training of the operator required, problems with respect to setting up and getting precisely accurate readings of a surface area, and problems of rapidly covering a large area of surface in order to find any portions which may have surface irregularities.

One of the most commonly used of the prior art methods was the use of a Clevite surface analyzer. This analyzer device uses a piezo-electric crystal attached to a mechanical stylus which is moved over the surface of the disc to be tested and which crystal was used to generate a signal which would be reflective of the surface conditions scanned. The expense of this equipment falls in the area of very large costs and requires approximately 1 hour to produce a sufficient number of linear traces to extract the actual surface flatness of the area of one side of a disc of seven inches radius. The accuracy is accomplished to within plus or minus 5 micro-inches.

Obviously such a slow method for checking the surface of a disc would be very costly because of the time factor and would limit the amount of production for checking suitable disc surfaces. Furthermore, since a mechanical contact or stylus is used, there are the usual inaccuracies and problems in such a mechanical system. Another disadvantage of this method is that only a single line may be checked at once while the area deviation is what is actually desired.

The apparatus of the present invention is capable of scanning the flatness of a 7 inch radius disc surface in a matter of 2 seconds or less and with a high accuracy — on the order of plus or minus 5 micro-inches. Thus, problems of long test time periods, long time skill and training, inaccuracies due to the mechanical system and need for leveling the magnetic disc, have been eliminated.

DESCRIPTION OF DRAWINGS

A more complete understanding of the flatness testing apparatus and the method by which it may be accomplished may be facilitated by reference to the following drawings in which:

FIG. 4 is a sketch showing how a beam $A_1$ having a diffraction limited angle of diffraction, $\phi$, may be subjected to a disturbance such that there is added another angle of deviation designated "$\theta$."

FIG. 5 is a sketch showing the action of rays of a light beam being reflected off an irregular surface.

FIG. 6A shows a corner cube retro-reflector and how incoming light is reflectively returned.

FIG. 6B is a sketch looking into the retro-reflector of FIG. 6A and showing the relationship of an incoming ray of light to an outgoing ray.

FIG. 6C is a sketch illustrating the surface of a magnetic disc as having peaks and valleys and how a beam of light may contact various surfaces thereof.

DESCRIPTION

Figure 1:
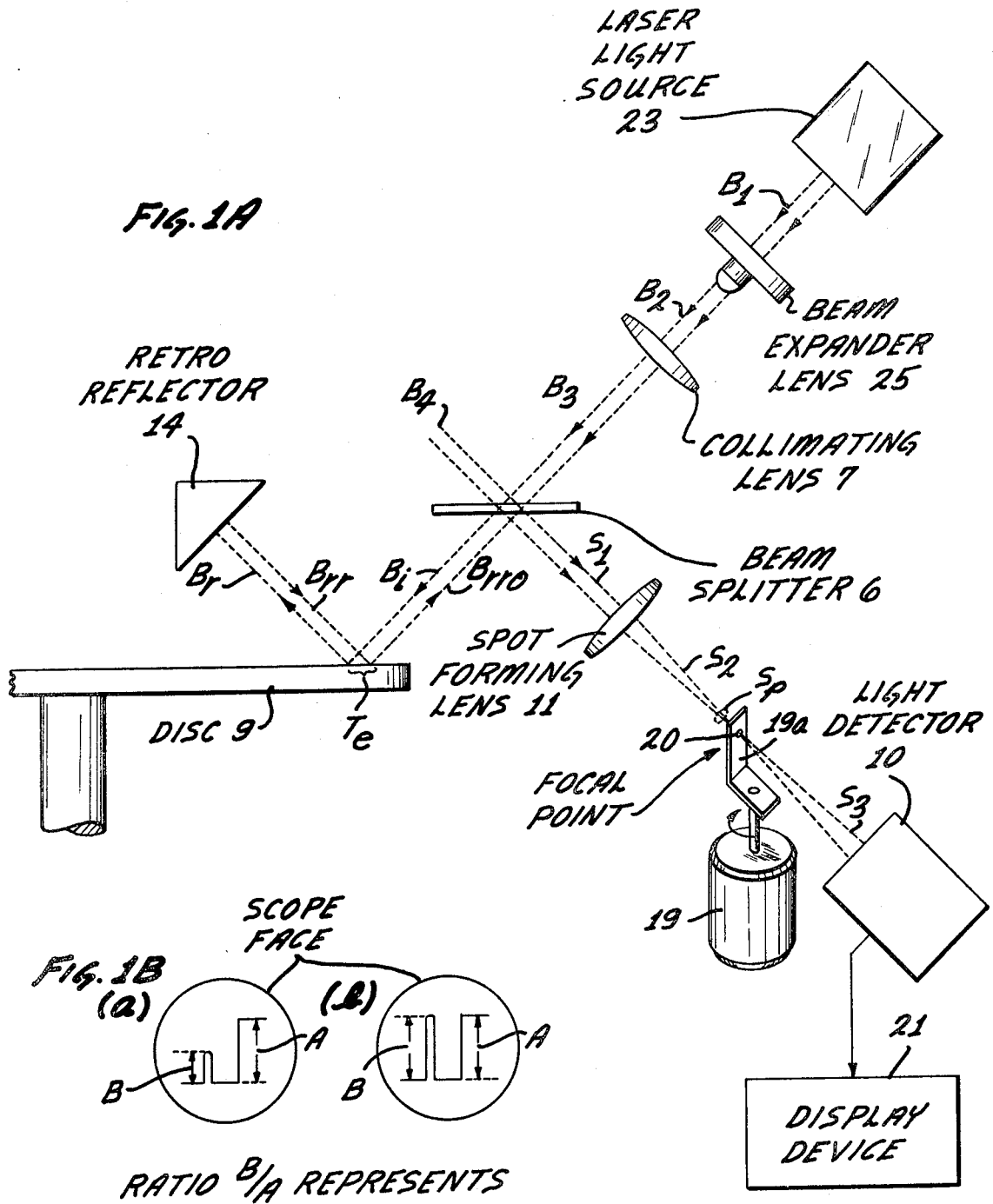
FIG. 1A represents a schematic drawing showing the elements involved in a preferred embodiment of the surface flatness tester.
FIG. 1B shows the display device of FIG. 1A as the faces (a) and (b) of an oscilloscope and showing how the ratio of pulses is a measure of surface flatness.
Figure 2:
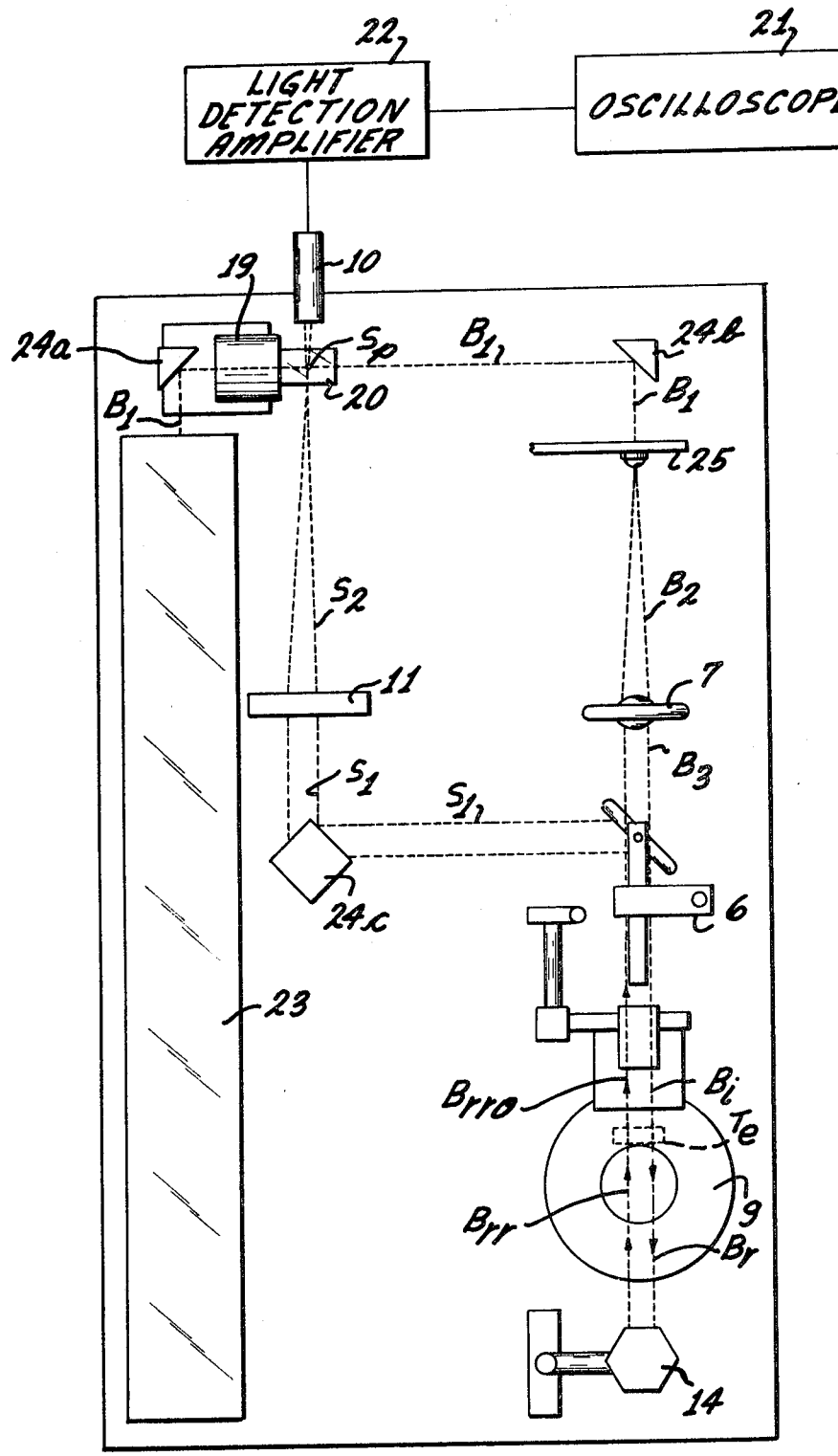
FIG. 2 is a drawing showing an actual layout of a working arrangement of the flatness testing apparatus.

Referring to FIG. 1A which shows a schematic diagram of the operative system and to FIG. 2 which shows an actual layout of the physical embodiment, it will be seen that an object having a surface to be tested for flatness, such as disc 9, is placed in the path of an incoming beam of light designated as $B_1$. The light beam $B_1$ has it source from a laser 23 which provides a continuous wave coherent light beam of, for example, 0.63 microns.

The beam $B_1$ is then passed through a beam expander lens 25 which causes the beam to be spread out to form a wider cross-sectional area beam which is designated in FIG. 1 as $B_2$.

The beam $B_2$ is then made to pass through a collimating lens 7 which serves the purpose of making all the entering rays from beam $B_2$ into parallel alignment so that the output side of the collimating lens 7 forms q collimated beam $B_3$. Collimated beam $B_3$ passes through a beam splitter 6 where the beam is split into two portions to form a reflected beam $B_4$ and a beam $B_i$ which passes directly through the beam splitter 6. No use is made of the reflected beam $B_4$.

Thus, there is provided an incoming or entering beam $B_i$ which strikes the surface area of the disc, disc 9, to be tested. This $B_i$ beam, when first reflected from the surface of disc 9, becomes beam $B_r$ which is directed up onto a corner cube reflector 14 which can be called retro-reflector 14 is such that any beam of light entering its inner face, symmetrically about the center, will be exactly reflected backward upon itself in a precisely parallel fashion.

The retro-reflected beam leaving the retro-reflector 14 is designated as $B_{rr}$ which then moves back to the same surface area being tested. The beam, $B_{rr}$, then reflects off the test surface to form a retro-reflected output beam designated $B_{rro}$. The $B_{rro}$ beam moves to the beam splitter 6 from which it is reflected to form a beam designated $S_1$. Beam $S_1$ is a result of diffraction-limited beam $B_3$ and the reflectively disturbed beams $B_r$ and $B_{rro}$.

The $S_1$ beam passes through a spot forming lens 11 to form a converging beam $S_2$ which converges at a distance equal to the focal length of the spot forming lens 11. At the principal focal point of the spot forming lens 11, (which is a distance F from the spot forming lens) there is formed a spot designated, $S_p$, this spot having a cross-sectional area and diameter size which can be precisely calculated; and which due to the configuration of the system will always remain stably at the exact same spot in space in relationship to the spot forming lens, regardless of small inaccuracies of the position of the surface to be tested.

A rotating motor 19 supports an L-bar $19_a$ on one end of which is an aperture 20 which rotates through the focal point of spot forming lens 11 exactly where the light spot $S_p$ is located. In so doing, it scans the cross-sectional area of the spot, $S_p$, permitting light from the spot $S_p$ to be sensed by light detector 10 along the beam line $S_3$.

The light detector 10 converts its light input into signal information which can be fed to a display device 21, such as an oscilloscope, which can be used to make the measured information more meaningful.

Referring to FIG. 2, there is shown a physical layout of the elements in a practically useful arrangement. Element 23 shows a source of light which may be a laser operating in a single transverse mode or it may represent a lamp, condensing optics and a pin hole-aperture to produce a diffraction limited beam $B_1$. A mirror $24a$ is adjusted to direct the beam $B_1$ onto another mirror $24b$ which directs beam $B_1$ to the beam expanding lens 25.

The expanded light beam from expander 25, now designated $B_2$, falls upon collimating lens 7 whose output forms beam $B_3$. The beam $B_3$ now passes through the beam splitter 6 to form beam $B_i$ onto a positioning mirror 16 which deflects the beam $B_i$ onto a selected surface area of the disc 9. The surface area particularly being tested at the moment is designated as $T_e$. The beam reflected off the surface $T_e$ now becomes the beam $B_r$ and is conveyed to retro-reflector 14 which turns back the incoming beam parallel to itself to form beam $B_{rr}$. The beam $B_{rr}$ then reflects off the surface $T_e$ to form the output beam $B_{rro}$, which is then reflected from the beam splitter 6 to form beam $S_1$ which, upon reaching adjustable mirror $24_c$, is reflected to the spot forming lens 11, whereupon it becomes a converging beam $S_2$ and forms a spot, $S_p$, having a diameter $D_s$ at the point location of the rotating aperture 20.

The rotating aperture 20 scans the spot $S_p$ to provide a light input to the light detector 10 which connects to light detection amplifier 22. The output of the amplifier 22 may be used to feed an output display device 21 which may be an oscilloscope or other display device.

It is most desirable in the usage of light beams, that a beam of light have zero divergence, that is to say, that the cross-sectional area of the beam remain constant at any place along the length of such a beam regardless of what length the beam may extend.

Unfortunately, this desired ideal of zero divergence does not occur in practice and there is always some amount of divergence of such a light beam.

Figure 3:
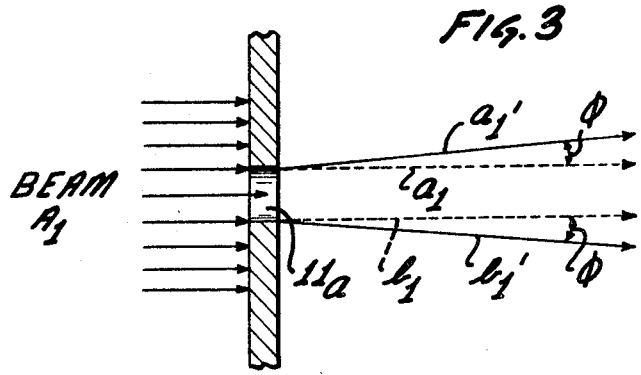
FIG. 3 is an illustration showing how a collimated beam $A_1$ has an angle of diffraction "$\phi$."

Referring to FIG. 3 in which a beam of light marked beam $a_1$ is passed through an aperture $11_a$, it is seen that an ideal beam of light could be looked as having rays $a_1$ and $b_1$ which are exactly parallel and which provide a constant cross-sectional area to the beam no matter how long the beam extends.

In practice, however, there occurs a divergence, shown by the angle $\phi$, which produces outer rays such as $a'_1$ and $b'_1$ because of the beam being passed through limiting aperture $11_a$.

It is not necessary to use monochromatic or coherent light to achieve a diffraction-limited light beam. It is only needful to provide an aperture which approximates the size of the diffraction-limited spot, $S_p$, so that the spot diameter $D_s=2F\phi$ where F is the focal length of an associated lens and $\phi$ is the diffraction-limited angle.

A salient feature of the present invention and apparatus is the use of "diffraction-limited light."

Diffraction-limited light is provided in the present system by the use of light eminating from a source appearing to be at an infinite distance away.

This is contrasted with light beams which are not diffraction-limited. An example of this would be, light generated from the face of a flashlight, an automobile headlight, or a bundle of fiber-optic glass conducting light to form a source of light radiation.

For example, in observing a star in the sky, it is understood that the size or cross-sectional area of the beam of light from the star is in no way a measure of the size or diameter of that star. The star in the distant heaven is essentially a point source of light at an infinite distance which provides a "diffraction-limited" beam of light.

This is not the case in situations where an object viewed is of considerable size and at a relatively close distance. In this case, such as that of a flashlight source, the size of the flashlight face and the closeness of it are comparable size to the diameter of the beam of light generated; and in this latter case the beam is considered quite different from that of a diffraction-limited beam.

Thus, the light source 23 of the present apparatus is specified as that of a light source which provides a diffraction-limited beam of light.

Knowing this to be the case, it is found that when the incoming beam $a_1$, $b_1$ is "incoherent" light then the minimum possible value of the angle $\phi$ is: $\phi = 1.22 \lambda \div D$ or $\phi = 1.22 \lambda/D$ (1)

In the case of "coherent" light (which is a group of light rays or light beams traveling in a constant phase relationship across a distance), the formula is as follows:

$$\phi = 1.6 \lambda \div D \text{ or } \phi = 1.6 \lambda/D \quad (2)$$

where $\lambda$ = wavelength of the light used
$D$ = diameter of lens $11_s$

Referring to FIG. 4, a lens $11_s$ is shown through which a light beam $A_2$ is directed (through the focal length F) to a spot $S_p$ having a spot diameter $D_s$.

The light beam $A_2$ is shown preceding from the light beam $A_1$ after having passed through an area of disturbance (which could be a reflection from a surface) 30. As seen in FIG. 4, the rays of beam $A_1$ already have the minimum diffraction angle $\phi$; and after the disturbance, the rays of the beam $A_2$ (using coherent light) have added other divergences shown by the angle $\theta$, so that the rays of the beam $A_2$ have a divergence shown by the summation of the angle $\theta$ and the angle $\phi$.

Thus, "$\phi$" is equal to the diffraction limited divergence angle and "$\theta$" is equal to the other divergences (due to surface disturbances for example).

Thus, it can be shown that the size of the spot $S_p$ will be such that its diameter $D_s$ is equal to $F(\theta + 2\phi)$ or $$D_s = F(\theta + 2\phi) \quad (3)$$

Now assuming that there is no disturbance such as element 30, then there will be no angle of divergence "$\theta$" to take into consideration. So that without this disturbance it will be seen that a minimum size spot, $S_p$, will be formed having a minimum diameter $D_s$ and which can be called a diffraction limited spot. This diffraction limited spot will have a diameter size equal to 2 × the focal length × the angle $\phi$ or: $D_s$ is equal to $2F\phi$ or:

$$D_s \text{ minimum} = 2F\phi \quad (4)$$

Referring to FIG. 5, a diffraction-limited beam of light, having for example parallel rays 28 with a diffraction-limited divergence angle $\phi$, is directed upon the surface of the object to be tested, said "apparent" surface being designated $T_e$.

The minimum divergence angle $\phi$ is given by:

$$\phi_{min} = F_s K \lambda \quad (5)$$

where $F_s$ is the speed of the lens 7, (lens 7 of FIG. 7A which corresponds to lens 11 of FIGS. 1 and 2) K is a value equal to 1.22 for non-coherent light and equal to 1.6 for coherent light. $\lambda$ represents lambda or the wavelength of the light.

The diffraction limited beam 28 reflects off the magnetic recording disc 9 having an apparent surface $T_e$ and is given an additional divergence by any non-uniformity in the disc surface as approximated in FIG. 5 where $T_e$ is the "apparent" surface of the disc while an actual indentation, for example, is shown as $C_a$ which has a chord designated as C. The distance $h$ is the sagitta of the arc and represents the distance between the "actual" irregular surface $C_a$ and that of an "apparent" flat surface $T_e$.

In this case, the chord C will nominally be considered as 1 inch in length. The specification of flatness is given by the formula of: $h/C^2 = T$ in micro-inches/inch².

Again referring to FIG. 5, the beam 28, when reflected, will be found to have an additional divergence designated as the angle $\theta$ which is a result of the irregularity or curvature of the disc surface from a perfectly flat surface. The divergence angle $\theta$ is developed as follows:

F will be designated as the focal length such that:

F is equal to ½ R where R is the radius of curvature of the irregularity $C_a$.

Using the right angle triangle having one side R, one side equal to C divided by 2, and one side equal to R-h, then by using the Pythagorean Theorem, we find:

$$R^2 = (R-h)^2 + (C/2)^2 \quad (6)$$

Using the basic specification of maximum allowable surface deviation as 35 micro-inches/inch², then the value of C is equal to 1 inch and the value of $h$ is equal to $35 \times 10^{-6}$, so that the value of R is:

$$R = 3.571 \text{ inches} \quad (7)$$

This is the maximum radius of curvature that can be tolerated for irregularity in a disc. The focal length F of a reflecting surface with this radius of curvature would be half of the radius R, so that F should be equal to 1,785 inches.

$$F = 1,785 \text{ inches} \quad (8)$$

Since R is equal to 2F, we then get:

$$(2F)^2 \text{ is equal to } (2F-h)^2 + (C/2)^2 \quad (9)$$

Thus, to determine the specification of flatness T as per the previous formula:

$$T = h/C^2 \text{ is equal to } 1/16F$$

and since:

$$C/F \text{ is equal to } \theta,$$

then:

$$T \text{ is equal or greater than } \theta/16C \quad (12)$$

$\theta$ is equal or less than 16TC (13)

Thus, the angle $\theta$ can be said to have a value which is equal to or must be less than 16 times the product of the basic specification of flatness in micro-inches per inch, per inch and the chord length.

Continuing with reference to FIG. 5, it should be repeated that the beam having light rays 28 is already a diffraction-limited beam which means that the divergence from parallelity of the various rays 28 will not be greater than the angle $\phi$ and equal to 1.6 $\lambda/D$ for coherent light, where D is the diameter of spot-forming lens 11 of FIG. 1.

Now, in addition to the minimal divergence angle $\phi$, the light beam 28 is passed against the surface $C_a$ which adds the extra divergence of $\theta$, which is then passed to a beam splitter 6 where it is reflected onto spot forming lens 11, (FIGS. 1 2), this lens having a diameter D.

Assuming the spot forming lens 11 has a focal length F', a fixed value, then a spot of light $S_p$ will be formed at the focal point of lens 11 such that this spot will have a diameter $D_s$ which is:

$$D_s \text{ is equal to } F' (\theta + \phi) \quad (14)$$

$$D_s \text{ is equal to } F' (\theta + 2F_s K \lambda) \quad (15)$$

$$D_s \text{ is equal to } F_s (C_1 \theta + 2K \lambda) \quad (16)$$

where $C_1$ = diameter D of lens 11 and $F_s$ (lens speed) is equal to $F'/C_1 = F'/D$. Thus, $$D_s \text{ is equal or less than } (16CTD + 2K\lambda) \quad (17)$$

As an example of this, if the diameter D of the lens 11 is 1 inch, that is to say, $C_1 = 1$ inch; the speed of the lens $F_s = 10$; the wavelength $\lambda = 0.6328$ microns; the factor K for coherent light is $K =$ to 1.6; the sample flatness area has diameter $C = 1$ inch and with the flatness specification $T = 35$ micro-inches per inch², we get:

$D_s$ is equal to or less than (18)
$10 [16(35)1 + 2(1.6) (0.628) (39.4)\pi$ micro-inch, or:
$D_s$ is equal to or less than $6.4 \times 10^{-3}$ (19)
inches That is to say, that the spot $S_p$ (of FIG. 1) will have a standard minimum diameter of at least 0.0064 inches.

Referring to FIG. 6A, there is shown the corner cube retro-reflector 14 having a central axis point $O_R$. An incoming beam, $I_i$, is shown entering the retro-reflector 14 and being precisely turned around to form outgoing beam $I_o$ which is exactly parallel to the incoming beam.

FIG. 6B shows a schematic looking toward the front end of the retro-reflector 14 as an incoming light beam would see it. Using the central access point $O_R$ as a reference, the point where the incoming beam $I_i$ strikes the back surface of the retro-reflector 14 is designated as point 31. This point can be referenced to the central access point $O_R$ in terms of polar coordinates having a radial distance $r$ and angle from the horizontal designated $w$. The incoming beam is then reflected from point 31 to point 32 from whence it becomes the outgoing beam $I_o$. The outgoing beam at point 32 will be found to have the polar coordinates designated as $r$, and $w + \pi$. The characteristic of the retro-reflector is such that any outgoing beam is always precisely parallel to any incoming beam.

FIG. 6C shows a typical surface contour $C_a$ in actuality quite different from the "apparent" surface flatness of a disc or other surface. $C_a$ is shown as a contour having peaks and troughs. If the light beam $B_t$ of FIG. 1 (which is the incoming beam to the surface-to-be-inspected) strikes surface $C_a$, there can arise several conditions. As seen in FIG. 6C the incoming beam $B_t$ may fall on a peak such as shown in ($a$) or a trough as shown in ($c$), in which cases the angle of divergence due to surface irregularity, (that is to say, $\theta$) will be doubled. Thus, from equation 17, then:

$$D_s = F_s (32CTD + 2K \lambda)$$

(20)

On the other hand if the incoming beam $B_t$ falls on a slope such as illustrated in ($b$), then the divergence angle $\theta$ is canceled out.

By making use of the retro-reflector 14, the critical alignment of the disc to the measuring apparatus is eliminated; however, it is necessary that the measurements be done on an overlapping basis so that the light beam can scan continuous areas on the disc in order to eliminate the effect of reading only the slope section as illustrated in FIG. 6C part ($b$). Thus, the incoming beam $B_t$ must be centered on the crest or trough of the defectively unflat surface area to maintain a proper reading of deviation in flatness.

Figure 7C:
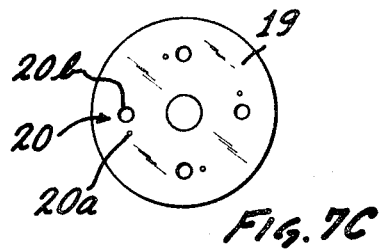
FIG. 7C shows more detail on the rotating aperture element of FIG. 7A.
Figure 7D:
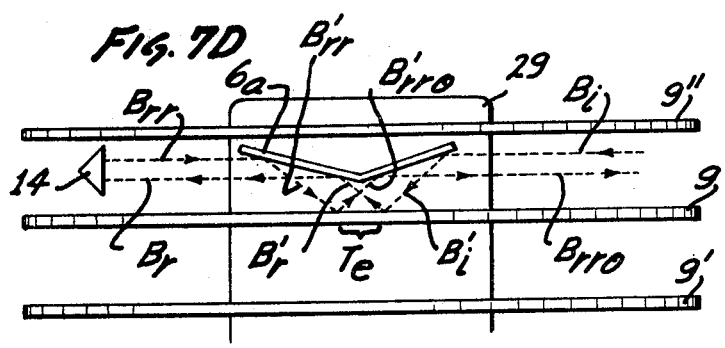
FIG. 7D is a drawing illustrating the use of mirrors to reflect light from disc surfaces not easily accessible.
Figure 7B:
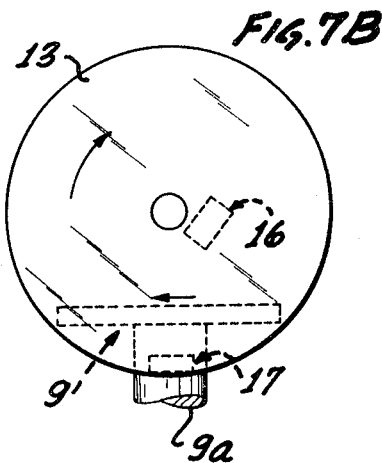
FIG. 7B shows in greater detail the revolving reflective mirrors used in FIG. 7A for deflecting light onto the surfaces of the magnetic disc.
Figure 7A:
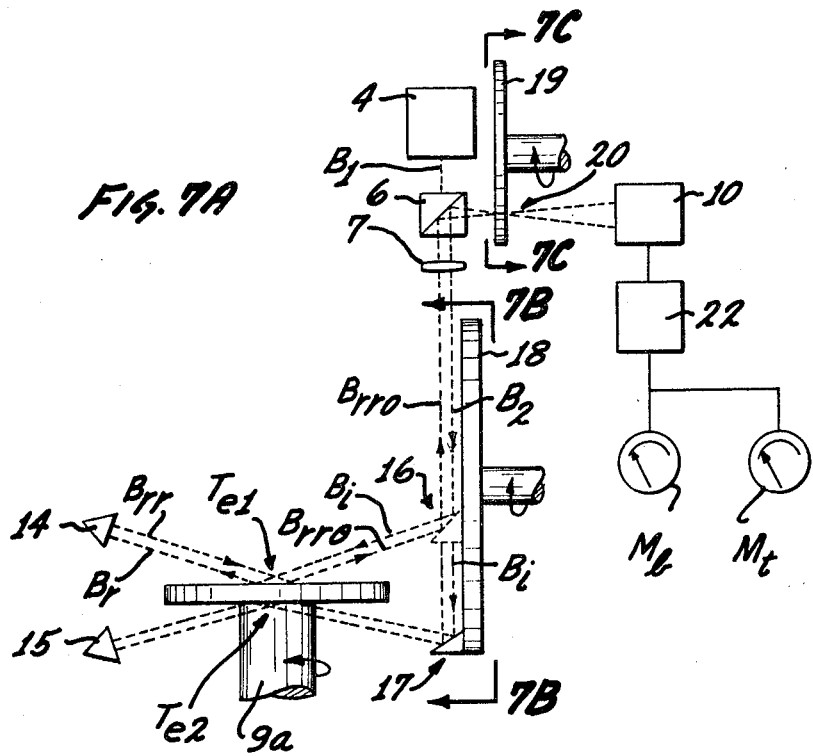
FIG. 7A shows a preferred embodiment of the invention applied on an automated basis for simultaneously measuring top and bottom surfaces of a magnetic disc.

Referring to FIG. 7A, there is shown a method and technique for the automation of the scanning and measuring system with the retro-reflectors such a that all of the surfaces of a disc or a disc pack can be simultaneously examined with a go-no go-procedure. In FIG. 7A, the element 9 represents a disc in a disc pack which is rotated on a spindle $9_a$ such that light may be reflected off the upper surfaces and the lower surfaces of the disc 9.

A source of light 4 is directed to beam splitter 6. The light beam from the source 4 is designated as $B_1$. It passes through the beam splitter 6 directly onto a lens 7 which collimates the light and directs it to a mirror 16, mounted on a rotating disc surface-selection mirror assembly 18.

The beam $B_t$, after deflection by mirror 16, is then directed to surfaces of disc 9 where it, as reflected beam $B_r$ enters into corner cube retro-reflector 14 and is then directed back as beam $B_{rr}$ where it is again reflected off the surfaces $T_{e1}$ and $T_{e2}$ to form beam $B_{rro}$ which is reflected from mirror 16 through lens 7 onto the beam splitter 6. The beam $B_{rro}$ is then reflected to a rotating aperture disc 19 having apertures 20 through which the reflected beam may pass onto a light detector 10.

The rotating disc 19 has apertures 20 composed of several sets or groups of apertures in series of two, as seen in FIG. 7B. The series of two apertures are composed of a large aperture $20_b$ and a small aperture $20_s$ wherein the large aperture $20_b$ permits all the light to pass through instantaneously and wherein the small aperture $20_s$ permits only measured amounts of light to pass through while it scans the spot of light beam $B_{rro}$ at the plane of apertures 20.

Electronic circuitry 22 is used to measure the light response for each set of apertures to give a reading on a measuring device such as meters $M_b$ and $M_s$ which read the light intensity for the large aperture $20_b$ and the small aperture $20_s$ respectively.

As seen in FIG. 7B, the rotating disc-surface-selection mirror assembly 18 has two mirrors, 16 and 17 which, during rotation of the disc 18, will cause the light beams $B_t$ (of FIG. 7A) to scan the upper and lower surfaces of disc 9. By maintaining a differential in the speed of rotation as between mirror-selection disc 18 and test disc 9, the light beam $B_t$ will scan areas of varying circumference on the disc 9 which, during the course of rotation, and transverse motion will insure that the entire area of the disc 9 will be scanned.

The rotating disc carrying mirrors 16 and 17 is designated as the selector 18. As 18 rotates with its offset mirrors 16 and 17, the beam $B_t$ reflects off of the top and bottom portions of disc 9 and into retro-reflectors 14 and 15, whereupon the beam is returned to surface of disc 9 and back to beam splitter 6.

The lens 7 (corresponding to lens 11 of FIGS. 1 and 2) focuses the beam, through the beam splitter 6 to a spot $S_p$ at the plane of apertures 20 of aperture disc 19.

During the period of time the light beam $B_{rro}$ reaches the apertures 20, light will be passed through the apertures 20.

One of the apertures, $20_s$ lets only the light through which is determined by the tolerance T; the other aperture, $20_b$ allows all of the light through. The light detector 10 responds to both light pulses which are fed to electronic circuitry 22 which compares the two pulses so that the difference between the ratio of the measured light and the total light is indicated on meters $M_t$ for top, and meter $M_b$ for bottom; that is to say, one meter measures the top surface while the other measures the bottom surface for magnitude of aberration from flatness.

The rotation of disc 9, selector 18 and the aperture wheel 19 are synchronized with electronic circuitry 22 such that the apertures in disc 19 gate the beam, when mirrors 16 or 17 are in the proper place, and such that the appropriate signals are distributed to the appropriate indicators as meters $M_t$ and $M_b$.

If plane mirrors are used for 16 and 17, then a slight scanning of the disc surface will occur as the beam enters the corner cubes. The mirrors 16 and 17 can be replaced by Amichi prisms which will minimize this scanning effect.

With reference to FIG. 7D, a technique is shown whereby a disc pack 29 composed of three parallel discs 9, 9', and 9'' can be tested using the apparatus shown in FIG. 2 or FIG. 7A.

Thus in order to get reflected lights into and out of a constricted space such as disc 9 of FIG. 7D, a precision mirror $6a$ having 2 faces suitably angled may be placed between two discs, such as 9 and 9''.

Thus the incoming beam, $B_t$, is reflected from one side of mirror $6a$ to form beam $B'_t$ which then reflects from disc surface $T_e$ to form beam $B'_r$. Beam $B'_r$ reflects from the second side of mirror $6a$ to form beam $B_r$ which (when retro-reflected by corner cube retro-reflector 14) becomes beam $B_{rr}$. Beam $B_{rr}$ reflects off the second side of mirror $6a$ and is designated $B'_{rr}$ where it reflects off of disc surface $T_e$ and is marked as $B'_{rro}$. After reflecting from the first side of mirror 6a, the beam is now designated $B_{rro}$. These designations also correspond to the beams marked in FIG. 1A.

Having described an apparatus and method useful for analysis of surface characteristics and especially useful for testing magnetic disc flatness, the following claims are made in regard to defining the invention:

What is claimed is:

1. An apparatus for determining deviations of a reflecting surface from an ideal surface comprising:
   means for exposing an area of said reflecting surface to light rays of a collimated beam of light, said means including a light source and means for projecting light from said source onto said reflecting surface;
   means for taking said reflected light from said reflecting surface and returning it along substantially parallel beams to the same exposed area of said reflecting surface;
   means for directing said returned light beam to form a light spot in space;
   said light spot in space always appearing at the same fixed point and having a size which is a function of the deviation of said exposed area from an ideal surface.

2. The apparatus as in claim 1 including: means for measuring the size of a spot of light reflected from said exposed surface.

3. The apparatus of claim 1 including: indicating means for indicating the ratio of the amount of light due to an elongated spot in space derived from reflection from the exposed surface and the amount of light from a light spot in space derived from the exposed surface when it is ideally flat.

4. The apparatus of claim 1 including: means for measuring the size change of said light spot in space in relationship to a minimum size diameter spot in space which is dependent on a function of an ideal exposed surface.

5. Apparatus for the sensing of surface shape comprising:
   a source of substantially diffraction-limited light;
   means for regulating the cross-sectional area of said beam of light;
   means for reflecting said beam of light from an exposed surface area of a surface to be sensed;
   means for directing said reflected beam through a spot-forming lens to a fixed spot in space;
   means for detecting the diameter size of said fixed spot in space;
   said diameter of said fixed spot in space being a function of the surface condition of the surface to be tested.

6. Apparatus for sensing the amount of deviation of surface flatness of an object from an ideally flat surface comprising:
   means for providing collimated light;
   means for shaping said light into a beam of a desired cross section;
   means for collimating said light beam and directing it to reflective exposure on a surface to be tested;
   retro-reflector means for taking the light reflected from the exposed test surface area and returning it back again to the reflective test surface area on beams precisely parallel to the beam reflected from the test surface area;
   means for directing the beam so doubly-reflected from the test surface area to a light spot-forming means which forms a light-spot at a fixed position in space;
   said means for directing the doubly-reflected beams, said spot forming means, said retro-reflector means and said test surface area working in such cooperation so as to make said fixed light spot have a size which is a function of the deviation of the test surface area from an ideally flat condition.

7. The apparatus of claim 6 suitable for rapid surface testing of both of a flat surface including: movable reflective means for directing a diffraction-limited light beam to reflectively scan different areas of both sides of said flat surface; means for rotating said flat surface to present different test areas to be scanned by said diffraction-limited light beam; means, synchronized with said movable reflective means and said surface rotating means, for measuring the amount of light doubly reflected from each test surface area scanned.

8. The apparatus of 1 wherein the area-exposing means comprises a light source and means for projecting a substantially diffraction-limited beam onto the reflecting surface.

9. The apparatus of claim 1, wherein the means taking reflected light from the reflecting surface and returning it comprises a retro-reflector.

10. The apparatus of claim 6, wherein the collimated light source means further comprises means for causing the light to be substantially diffraction-limited.

* * * * *